United States Patent
Kim et al.

(10) Patent No.: US 10,875,542 B2
(45) Date of Patent: Dec. 29, 2020

(54) DEVICE AND METHOD FOR CONTROLLING FAIL-SAFE FOR VEHICLE, AND VEHICLE SYSTEM

(71) Applicants: Hyundai Motor Company, Seoul (KR); Kia Motors Corporation, Seoul (KR)

(72) Inventors: Hyeon Jun Kim, Siheung-si (KR); Yong Hyun Kim, Gyeonggi-do (KR); Kyung Su Kim, Asan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/555,366

(22) Filed: Aug. 29, 2019

(65) Prior Publication Data

US 2020/0283008 A1     Sep. 10, 2020

(30) Foreign Application Priority Data

Mar. 5, 2019   (KR) .................. 10-2019-0025350

(51) Int. Cl.
   *B60W 10/10*     (2012.01)
   *B60W 50/038*   (2012.01)
   (Continued)

(52) U.S. Cl.
   CPC .......... *B60W 50/038* (2013.01); *B60W 10/04* (2013.01); *B60W 10/10* (2013.01);
   (Continued)

(58) Field of Classification Search
   CPC ............... B60W 50/038; B60W 10/18; B60W 50/0205; B60W 10/04; B60W 10/10; B60W 2710/1005; B60W 2540/10; B60W 2540/12; B60W 2510/18; B60W 2710/18; B60W 10/182; B60W 2710/188; B60W 30/18027; B60W 30/18054
   (Continued)

(56) References Cited

U.S. PATENT DOCUMENTS 8,649,951 B2    2/2014  Funakoshi et al.
10,710,596 B1*  7/2020  Kern .................. G10L 15/08
(Continued)

FOREIGN PATENT DOCUMENTS

| JP | 2009-281578 A | 12/2009 |
| JP | 5463620 B2 | 4/2014 |
| KR | 10-1349433 B1 | 1/2014 |

OTHER PUBLICATIONS

English translation of KR20130064915A (equivalent to KR101349433B1); http://translatinportal.epo.org; Sep. 16, 2020 (Year: 2020).*

*Primary Examiner* — Roger L Pang
(74) *Attorney, Agent, or Firm* — Morgan, Lewis & Bockius LLP

(57) ABSTRACT

A device for controlling fail-safe for a vehicle includes a driving device that engages a clutch and a brake individually in a stopped state of the vehicle when a shift by wire system fails, and a controller that locks the engaged clutch and brake, and unlocks the clutch and the brake when a predetermined unlock manipulation pattern is input using a brake pedal and an accelerator pedal of the vehicle.

20 Claims, 8 Drawing Sheets

(51) Int. Cl.
 *B60W 10/18* (2012.01)
 *B60W 50/02* (2012.01)
 *B60W 10/04* (2006.01)
 *B60W 30/18* (2012.01)

(52) U.S. Cl.
 CPC .......... *B60W 10/18* (2013.01); *B60W 10/182* (2013.01); *B60W 50/0205* (2013.01); *B60W 30/18027* (2013.01); *B60W 30/18054* (2013.01); *B60W 2510/18* (2013.01); *B60W 2540/10* (2013.01); *B60W 2540/12* (2013.01); *B60W 2710/1005* (2013.01); *B60W 2710/18* (2013.01); *B60W 2710/188* (2013.01)

(58) Field of Classification Search
 USPC .......................................................... 701/62
 See application file for complete search history.

(56) References Cited

U.S. PATENT DOCUMENTS

| | | | |
|---|---|---|---|
| 2008/0040009 A1* | 2/2008 | Kamada | F16H 61/12 701/51 |
| 2011/0010064 A1 | 1/2011 | Funakoshi et al. | |
| 2015/0232100 A1* | 8/2015 | Yamamoto | B60W 30/18027 477/92 |
| 2020/0271221 A1* | 8/2020 | Kamio | B60W 10/11 |

\* cited by examiner

| CAN STATE | | CONTROL SIGNAL INPUT |
|---|---|---|
| P_CAN | H_CAN | |
| ○ | ○ | P_CAN BUS ~311 |
| ○ | × | P_CAN BUS ~313 |
| × | ○ | H_CAN BUS ~315 |
| × | × | IGNORE(FAIL-SAFE/BACK-UP CONTROL) ~317 |

FIG. 3

| <Fail-safe> | |
|---|---|
| VEHICLE SPEED > 0 | • MAINTAIN D-GEAR DRIVING ~411 |
| VEHICLE SPEED = 0 | • ENGAGE P-GEAR<br>• ENGAGE ELECTRONIC PARKING BRAKE (EPB) ~415 |

FIG. 4

<BACK-UP CONTROL>

(a) INDICATE FAULT CONDITION OF SHIFT BY WIRE SYSTEM (b) DETECT INPUT OF BRAKE PEDAL OR ACCELERATOR PEDAL → INDICATE UNLOCK MANIPULATION (c) UNLOCK MANIPULATE USING BRAKE PEDAL AND ACCELERATOR PEDAL (d) UNLOCK CLUTCH/EPB (e) ENGAGE D-GEAR → ALLOW ACCELERATION (LIMIT CREEP TORQUE)

FIG. 5

DEVICE AND METHOD FOR CONTROLLING FAIL-SAFE FOR VEHICLE, AND VEHICLE SYSTEM

CROSS-REFERENCE TO RELATED APPLICATION

This application claims the benefit of priority to Korean Patent Application No. 10-2019-0025350, filed in the Korean Intellectual Property Office on Mar. 5, 2019, the entire contents of which are incorporated herein by reference.

TECHNICAL FIELD

The present disclosure relates to a device and a method for controlling fail-safe for a vehicle, and to a vehicle system.

BACKGROUND

A shift by wire system employs an electronic push button-based shift selector to allow electronic gear shifting without requiring a driver to manually shift a gear lever.

This shift by wire system is vulnerable to moisture and mechanical failure because the shift by wire system operates electronically. When a wrong input signal is transmitted from inside the shift by wire system due to the fault of the shift by wire system, safety of the driver may be threatened.

When the shift by wire system fails, a vehicle may be forcibly stopped to prevent an accident due to the wrong input.

However, when the vehicle does not move upon operating, by a driver, an accelerator pedal of the vehicle in a stopped state, the driver may be embarrassed without knowing why the vehicle is not moving. This may cause the driver to perform a wrong operation, so that the driver may be put into a dangerous situation.

SUMMARY

The present disclosure has been made to solve the above-mentioned problems occurring in the prior art while advantages achieved by the prior art are maintained intact.

An aspect of the present disclosure provides a device and a method for controlling fail-safe for a vehicle, and a vehicle system, in which a fail-safe mode is activated and a vehicle stops stably when an electronic push button-based shift selector of a shift by wire system fails and in which temporal unlocking is implemented by inputting of a predetermined pattern when the vehicle traveling is required for emergency movement, thereby dealing with emergency situations quickly.

Another aspect of the present disclosure provides a device and a method for controlling fail-safe for a vehicle, and a vehicle system, in which only using a brake pedal and an accelerator pedal without adding any additional means may allow the unlocking for emergency movement, thereby removing any cost increase.

The technical problems to be solved by the present inventive concept are not limited to the aforementioned problems, and any other technical problems not mentioned herein will be clearly understood from the following description by those skilled in the art to which the present disclosure pertains.

According to an exemplary embodiment of the present disclosure, a device for controlling fail-safe for a vehicle includes: a driving device that engages a clutch and a brake individually in a stopped state of the vehicle when a shift by wire system fails; and a controller that locks the engaged clutch and brake, and unlocks the clutch and the brake when a predetermined unlock manipulation pattern is input using a brake pedal and an accelerator pedal of the vehicle.

The device may further include a determining device that monitors manipulation states of the brake pedal and the accelerator pedal of the vehicle in the locked state of the clutch and the brake.

The device may further include a message processing device that outputs a message guiding the unlock manipulation pattern of the clutch and the brake when the manipulation of the brake pedal or the accelerator pedal of the vehicle is identified in the locked state of the clutch and the brake.

The unlock manipulation pattern may be set as a combination of inputs of the brake pedal and the accelerator pedal.

When the brake pedal and the accelerator pedal are manipulated in a continuous pattern, the determining device may determine whether the manipulation pattern matches the unlock manipulation pattern.

The message processing device may output a message indicating a fault state of the shift by wire system when the shift by wire system fails.

The driving device may switch the clutch from a park-gear to a drive-gear when the clutch and the brake are unlocked.

The controller may output a drive torque based on a degree to which the accelerator pedal is manipulated when the clutch and the brake are unlocked and the accelerator pedal is manipulated.

The driving device may be disengaged from the brake when the clutch and the brake are unlocked and the accelerator pedal is manipulated.

The controller may limit a creep torque when the clutch and the brake are unlocked.

The controller may lock the clutch and the brake engaged with the driving device when the vehicle is stopped after the unlocking of the clutch and the brake.

When the shift by wire system fails and an engine of the vehicle is turned-off, the controller may maintain the locked state of the clutch and the brake when the engine of the vehicle is reactivated.

According to another exemplar)/embodiment of the present disclosure, a method for controlling fail-safe for a vehicle includes: engaging a clutch and a brake individually in a stopped state of the vehicle when a shift by wire system fails; locking the engaged clutch and brake; and unlocking the clutch and the brake when a predetermined unlock manipulation pattern is input using a brake pedal and an accelerator pedal of the vehicle.

According to still another exemplar)/embodiment of the present disclosure, a vehicle system includes: a shift by wire system of a vehicle; and a fail-safe controlling device that monitors a fault state of the shift by wire system, engages and locks a clutch and a brake individually in a stopped state of the vehicle when the shift by wire system fails, and unlocks the clutch and the brake when a predetermined unlock manipulation pattern is input using a brake pedal and an accelerator pedal of the vehicle.

BRIEF DESCRIPTION OF THE DRAWINGS

The above and other objects, features and advantages of the present disclosure will be more apparent from the following detailed description taken in conjunction with the accompanying drawings:

FIGS. 3 to 5 illustrate an embodiment referenced to illustrate an operation of a device for controlling fail-safe for a vehicle according to an exemplary embodiment of the present disclosure;

DETAILED DESCRIPTION

Figure 1:
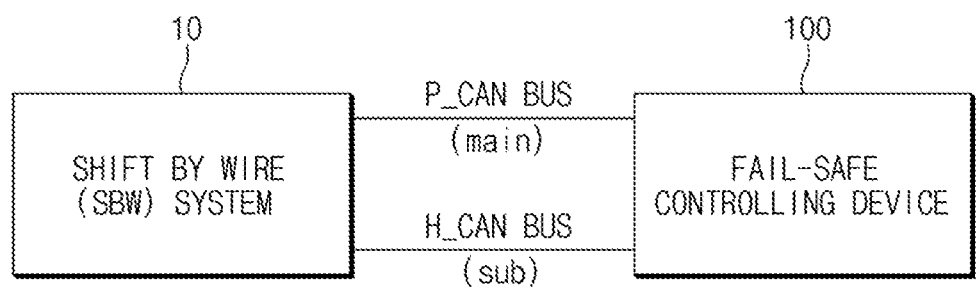
FIG. 1 illustrates a configuration of a vehicle system according to an exemplar)/embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a configuration of a vehicle system according to an exemplar)/embodiment of the present disclosure.

Referring to FIG. 1, a vehicle system according to an exemplary embodiment of the present disclosure may include a shift by wire system 10 and a fail-safe controlling device 100.

The shift by wire system 10 is a system that controls shift of a vehicle, and may correspond to a shift by wire (SBW) system that employs an electronic push button-based shift selector to electronically process the shift of the vehicle.

The fail-safe controlling device 100 may be connected via a CAN BUS of the shift by wire system 10. In this connection, the CAN BUS may include a P_CAN BUS as a main communication line and an H_CAN BUS as a sub communication line.

The fail-safe controlling device 100 may transmit and receive signals to and from the shift by wire system 10 via the P_CAN BUS, the main communication line. When an error occurs in the P_CAN, the fail-safe controlling device 100 may transmit and receive signals to and from the shift by wire system 10 via the H_CAN BUS, the sub communication line.

The fail-safe controlling device 100 monitors a fault condition of the shift by wire system 10. Specifically, the fail-safe controlling device 100 may recognize that the shift by wire system 10 has failed when errors occur simultaneously in the P_CAN and the H_CAN.

When the vehicle stops when the shift by wire system 10 fails, the fail-safe controlling device 100 engages a clutch to a park-gear (P-gear) in the stopped state, and engages a brake, and then locks the clutch and the brake.

Further, when vehicle traveling is required for emergency movement, and when an unlock operation of a predetermined pattern is inputted using a brake pedal and an accelerator pedal of the vehicle, the fail-safe controlling device 100 may unlock the clutch and the brake, and allow acceleration.

A detailed configuration and an operation of the fail-safe controlling device 100 will be described in more detail with reference to an exemplary embodiment of FIG. 2.

The fail-safe controlling device 100 according to the present disclosure may be implemented inside the vehicle. In this connection, the fail-safe controlling device 100 may be integrally formed with internal controllers of the vehicle, or may be implemented as a separate device and connected to the controllers of the vehicle via separate connecting means.

Figure 2:
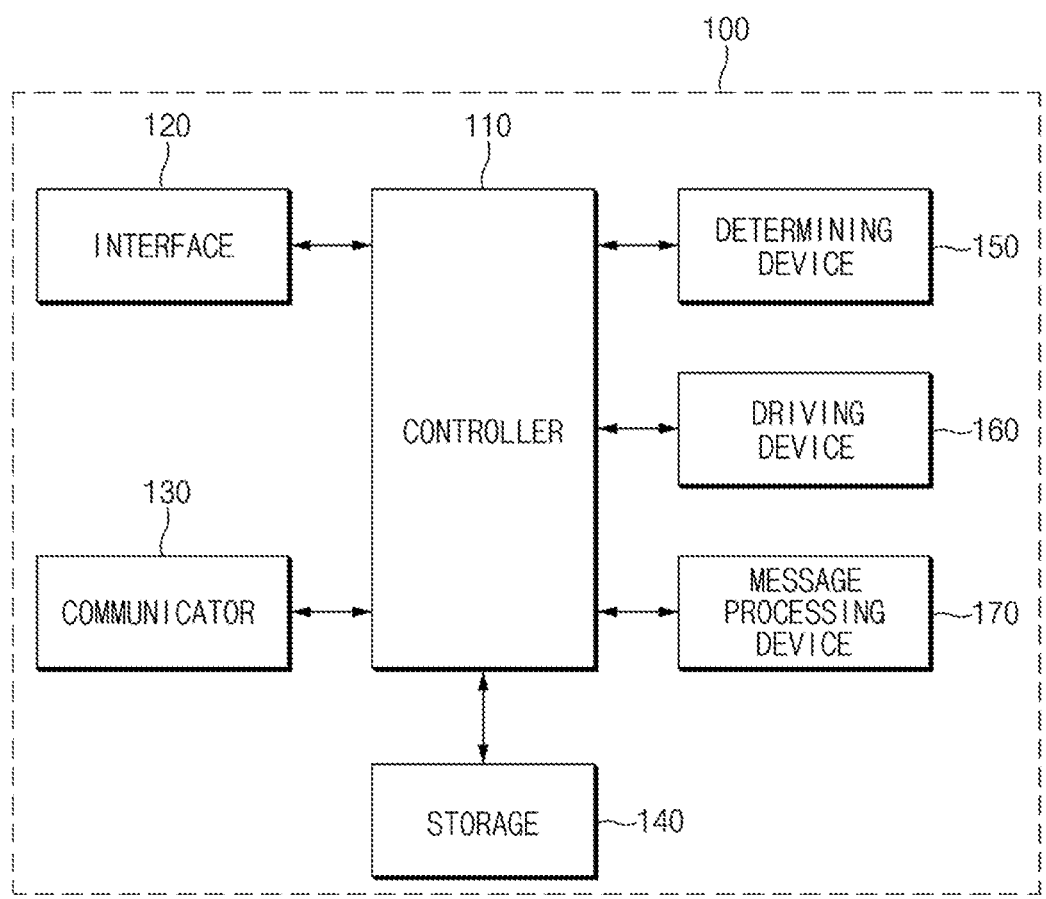
FIG. 2 illustrates a configuration of a device for controlling fail-safe for a vehicle according to an exemplar)/embodiment of the present disclosure.

FIG. 2 illustrates a configuration of a device for controlling fail-safe for a vehicle according to an exemplary embodiment of the present disclosure.

Referring to FIG. 2, the fail-safe controlling device 100 may include a controller 110, an interface 120, a communicator 130, storage 140, a determining device 150, a driving device 160, and a message processing device 170. In this connection, the controller 110, the determining device 150, and/or the message processing device 170 of the fail-safe controlling device 100 according to the present embodiment may be implemented as at least one processor.

In some embodiments, the controller 110 may be an electronic control unit (ECU) or any other processor (e.g., computer, microprocessor, ASIC, logic circuitry, central processing unit (CPU), etc.), but not limited thereto, and may control the functions of the determining device 150, the driving device 160, and the message processing device 170. Alternatively, the controller 110 may include the determining device 150, the driving device 160, and the message processing device 170 embedded therein.

The controller 110 may process signals transmitted between components of the fail-safe controlling device 100.

The interface 120 may include input means for receiving a control command from a user and output means for outputting a manipulation state, a result, and the like of the fail-safe controlling device 100.

In this connection, the input means may include a key button, and may include a mouse, a joystick, a jog shuttle, a stylus pen, or the like. The input means may also include a soft key implemented on a display.

The output means may include the display and may include audio output means such as a speaker. In this connection, when a touch sensor such as a touch film, a touch sheet, a touch pad, or the like is provided on the display, the display operates as a touch screen, and is implemented as a form into which the input means and the output means are integrated.

In this connection, the display may be at least one of a liquid crystal display (LCD), a thin film transistor-liquid crystal display (TFT LCD), an organic light-emitting diode (OLED), a flexible display, a field emission display (FED), or a 3D display.

The communicator 130 may include a communication module for vehicle network communication with electrical components and/or the controllers provided in the vehicle. In one example, the communication module may communicate with the shift by wire system 10 to transmit and receive signals. Further, the communication module may transmit a drive torque signal to the controller or the driving device of the vehicle.

In this connection, the vehicle network communication technology may include CAN (Controller Area Network) communication, LIN (Local Interconnect Network) communication, Flex-Ray communication, and the like.

In addition, the communicator may include a communication module for wireless Internet access or a communication module for short range communication.

In this connection, a wireless Internet technology may include a wireless LAN (MILAN), a wireless broadband (Wibro), a Wi-Fi, a World Interoperability for Microwave Access (Wimax), and the like. Further, a short range communication technology may include Bluetooth, ZigBee, Ultra Wideband (UWB), Radio Frequency Identification (RFID), Infrared Data Association (IrDA), and the like.

The storage 140 may store data and/or algorithms necessary for the fail-safe controlling device 100 to operate.

In one example, the storage 140 may store commands and/or algorithms for monitoring the fault condition of the shift by wire system 10. The storage 140 may also store commands and/or algorithms for performing operations for fail-safe and/or backup control when the shift by wire system 10 fails.

In this connection, the storage 140 may include a storage medium such as a random access memory (RAM), a static random access memory (SRAM), a read-only memory (ROM), a programmable read-only memory (PROM), and an electrically erasable programmable read-only memory (EEPROM).

The determining device 150 monitors whether the shift by wire system 10 fails. When the shift by wire system 10 fails, the determining device 150 transmits fault occurrence information of the shift by wire system 10 to the controller 110, the driving device 160, and/or the message processing device 170.

In addition, the determining device 150 monitors manipulation states of the brake pedal or the accelerator pedal of the vehicle in the locked state of the clutch and the brake when the shift by wire system 10 fails.

When the shift by wire system 10 fails, and when the brake pedal or the accelerator pedal is manipulated after the clutch and the brake are locked based on a fail-safe logic while the vehicle is in the stopped state, the determining device 150 may determine that a driver has an intention to drive for the emergency movement. Therefore, when it is identified that the brake pedal or the accelerator pedal is manipulated after the clutch and brake are locked, the determining device 150 may transmit operation information of the brake pedal and the accelerator pedal to the controller 110 and/or the message processing device 170.

Further, when the brake pedal and the accelerator pedal are manipulated in a continuous pattern in the locked state of the clutch and the brake, the determining device 150 determines whether the manipulated pattern matches the predetermined unlock manipulation pattern. In this connection, when the manipulated pattern matches with the predetermined unlock manipulation pattern, the determining device 150 may transmit matching information to the controller 110 and/or the driving device 160.

The driving device 160 may engage the clutch and the brake in the stopped state of the vehicle when the shift by wire system 10 fails. At this time, the driving device 160 engages the clutch with the park-gear (P-gear). In this connection, the brake may be an electronic parking brake (EPB). The electronic parking brake (EPB) refers to a brake that generates braking force by an actuator in an electronic manner, not by physical force.

The driving device 160 may disengage the clutch and the brake when the clutch and the brake are unlocked by the predetermined unlock pattern operation. In this connection, the driving device 160 may disengage the brake when the brake is unlocked and the acceleration of the vehicle is started.

In addition, the driving device 160 may switch the clutch from the park-gear (P-gear) to a drive-gear (D-gear) when the clutch is unlocked by the predetermined unlock pattern operation.

When it is identified that the shift by wire system 10 fails, the controller 110 may transmit fault occurrence information to the message processing device 170. At this time, the message processing device 170 may output a message indicating the fault condition of the shift by wire system 10. In this connection, the message processing device 170 outputs the message on the display screen so that the driver may recognize the fault condition of the shift by wire system 10.

When the operation of the brake pedal or the accelerator pedal of the vehicle is identified in the locked state of the clutch and the brake, the message processing device 170 may output a message indicating the unlock manipulation pattern of the clutch and the brake.

In this connection, the unlock manipulation pattern may be set as a combination of inputs of the brake pedal and the accelerator pedal. In one example, the unlock manipulation pattern may be a pattern in which the accelerator pedal is manipulated for a predetermined time in a manipulated state of the brake pedal. The unlock manipulation pattern may be changed according to an embodiment, and may be set in a simple pattern in consideration of ease of operation of the driver.

When the clutch and the brake are unlocked, the message processing device 170 may output a message indicating the unlocked state of the clutch and the brake.

The controller 110 indicates the fault condition of the shift by wire system 10. When the vehicle stops, the controller 110 locks the clutch and brake engaged by the driving device 160 to prevent unintentional disengagement of the clutch and the brake.

Further, the controller 110 may unlock the clutch and the brake when the unlock operation of the predetermined pattern is inputted using the brake pedal and the accelerator pedal of the vehicle.

The controller 110 may output the drive torque based on a degree to which the accelerator pedal is manipulated when the accelerator pedal is manipulated after the clutch and the brake are unlocked. In this connection, the controller 110 may limit a creep torque when the clutch and the brake are unlocked.

Further, after the clutch and the brake are unlocked, the vehicle accelerates based on the operation of the accelerator pedal, and then the vehicle is stopped again. In this case, the controller 110 may lock the clutch and the brake engaged by the driving device 160 again.

FIG. 3 illustrates a control signal input based on a communication state between a shift by wire system and a fail-safe controlling device according to an exemplar)/embodiment of the present disclosure.

Referring to FIG. 3, when the P_CAN and the H_CAN are both normal as indicated by reference numeral 311, the shift by wire system 10 and the fail-safe controlling device 100 may transmit and receive the signals via the P_CAN BUS, the main communication line.

Further, when the error occurs in the H_CAN as indicated by reference numeral 313, the shift by wire system 10 and the fail-safe controlling device 100 may transmit and receive the signals via the P_CAN BUS, the main communication line.

When an error occurs in the P_CAN and the H_CAN operates normally as indicated by reference numeral 315, the shift by wire system 10 and the fail-safe controlling device 100 may transmit and receive the signals via the H_CAN BUS, the sub communication line.

Further, when errors occur in both the P_CAN and the H_CAN as indicated by reference numeral 317, the fail-safe controlling device 100 determines that the fault has occurred in the shift by wire system 10 and ignores the input signal of the shift by wire system 10. At this time, the fail-safe controlling device 100 performs the fail-safe and backup controls.

FIG. 4 illustrates an embodiment of the fail-safe control operation.

Referring to FIG. 4, the fail-safe controlling device 100 performs the fail-safe control operation when the fault of the shift by wire system 10 is identified. In this connection, when it is identified that a vehicle speed exceeds 0 (zero) and the vehicle is in a driving state as indicated by reference numeral 411, the fail-safe controlling device 100 may indicate the fault state of the shift by wire system 10 while maintaining the D-gear driving.

Further, when it is identified that the vehicle speed is 0 (zero) and the vehicle is in the stopped state as indicated by reference numeral 415, the fail-safe controlling device 100 may automatically engage the clutch to the P-gear, which is the park-gear, and automatically engage the brake (EPB) in order to secure safety.

FIG. 5 illustrates a backup control operation according to an exemplary embodiment of the present disclosure.

Referring to FIG. 5, when the fault condition of the shift by wire system 10 is identified, the fail-safe controlling device 100 indicates the fault state of the shift by wire system 10 to the driver as shown in (a).

Further, the fail-safe controlling device 100 detects input of the brake pedal or the accelerator pedal in the locked state of the clutch and the brake and, when the operation input is identified, guides the driver of the unlock manipulation pattern, as shown in (b).

Further, the fail-safe controlling device 100, as shown in (c), monitors the unlock operation using the brake pedal and the accelerator pedal and, when the predetermined unlock manipulation pattern is input for the emergency movement, temporarily unlocks the locking of the clutch and the brake (EPB) as shown in (d).

Further, when the clutch and the brake are unlocked, the fail-safe controlling device 100 engages the clutch to the drive-gear to allow the acceleration as shown in (e).

The fail-safe controlling device 100 according to the present embodiment operating as described above may be implemented in a form of an independent hardware device including a memory and a processor for processing each operation or may be implemented in a form embedded in another hardware device such as a microprocessor or a general purpose computer system.

An operation flow of the device according to the present disclosure as configured above will be described in more detail as follows.

Figure 6:
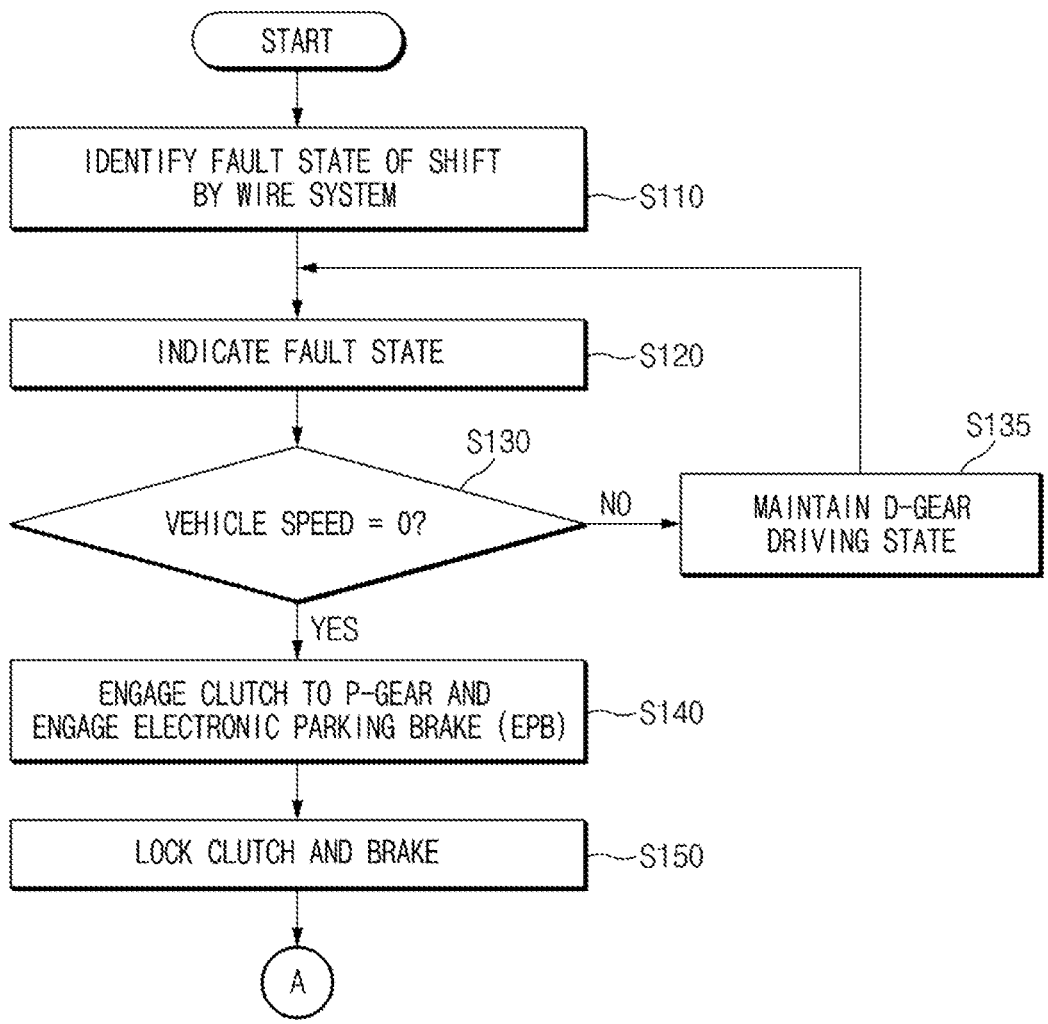
FIGS. 6 and 7 are flowcharts of a method for controlling fail-safe for a vehicle according to an exemplar)/embodiment of the present disclosure.

FIG. 6 is a flowchart of a method for controlling fail-safe for a vehicle according to an exemplary embodiment of the present disclosure.

Referring to FIG. 6, when the fault state of the shift by wire system 10 is identified (S110), the fail-safe controlling device 100 indicates the fault state of the shift by wire system 10 to the driver (S120). In 'S120', the fail-safe controlling device 100 may output the message indicating the fault state of the shift by wire system 10 on the display.

When the vehicle speed is not "0" after the fault state of the shift by wire system 10 is identified (S130), the fail-safe controlling device 100 maintains the D-gear driving state (S135), and continues to indicate the fault state of the shift by wire system 10 (S120).

Further, when the vehicle is stopped and the vehicle speed becomes zero after the fault state of the shift by wire system 10 is identified (S130), the fail-safe controlling device 100 executes the fail-safe control operation to engage the clutch to the P-gear and engage the brake (EPB) (S140). Thereafter, the fail-safe controlling device 100 locks the engaged clutch and brake to prevent the clutch and the brake from being unlocked randomly or unintentionally (S150).

Figure 7:
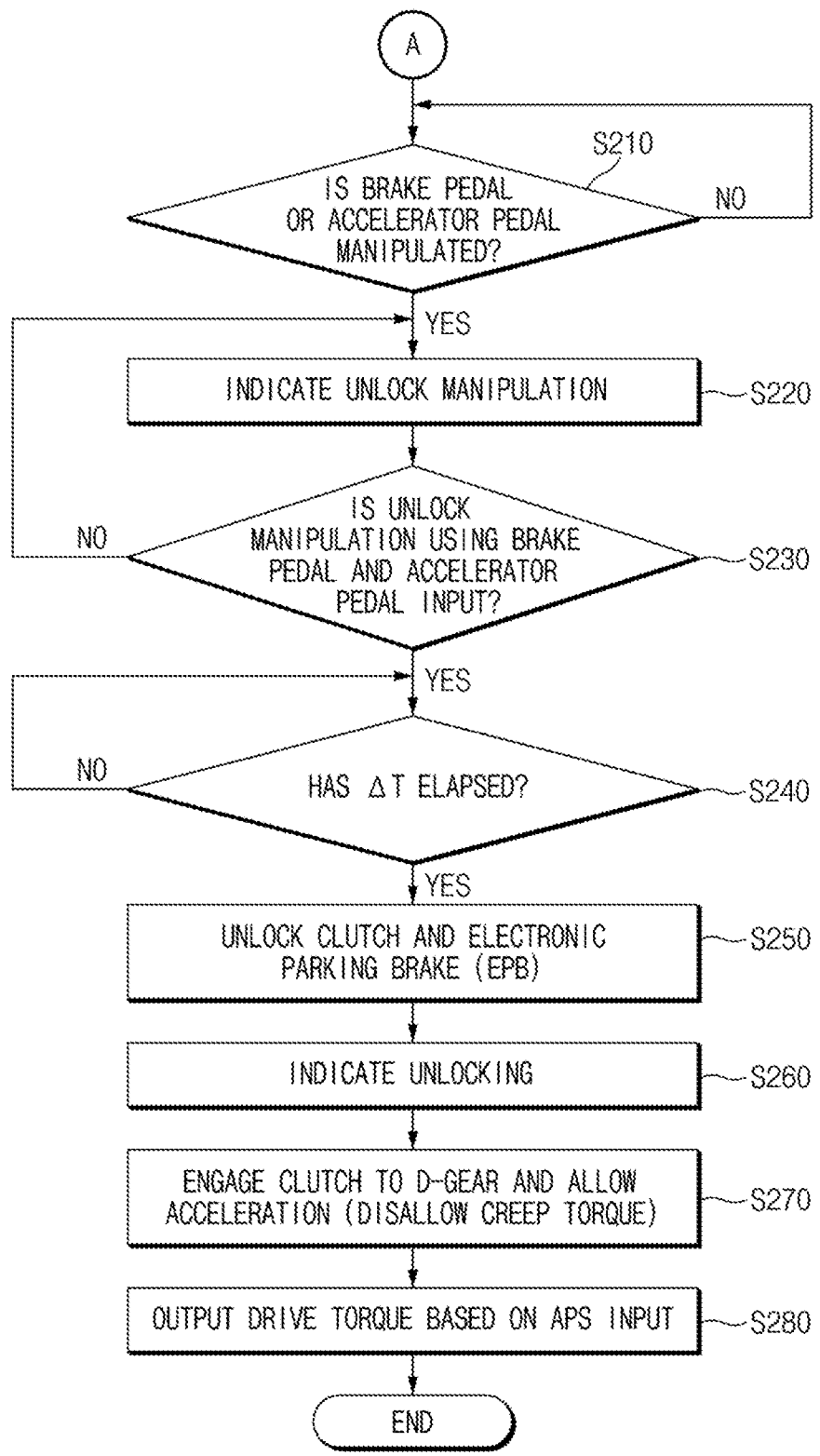

Thereafter, when the clutch and the brake are locked, the fail-safe controlling device 100 performs the backup control operation after 'A' in FIG. 7.

Referring to FIG. 7, when the brake pedal or the accelerator pedal is manipulated in the locked state of the clutch and the brake (S210), the fail-safe controlling device 100 determines that the emergency movement is attempted and indicates the unlock manipulation pattern to the driver (S220).

When the unlock manipulation pattern indicated to the driver is inputted using the brake pedal and the accelerator pedal after 'S220' (S230), after a predetermined time has elapsed (S240), the fail-safe controlling device 100 unlocks the clutch and the brake (EPB) (S250).

When the clutch and brake (EPB) are unlocked in 'S250', the fail-safe controlling device 100 engages the clutch to the D-gear, which is the drive-gear, to allow the acceleration (S270). At this time, the fail-safe controlling device 100 disallows the creep torque output.

When the accelerator pedal is manipulated, the fail-safe controlling device 100 outputs the drive torque based on an accelerator position sensor (APS) input (S280).

Figure 8:
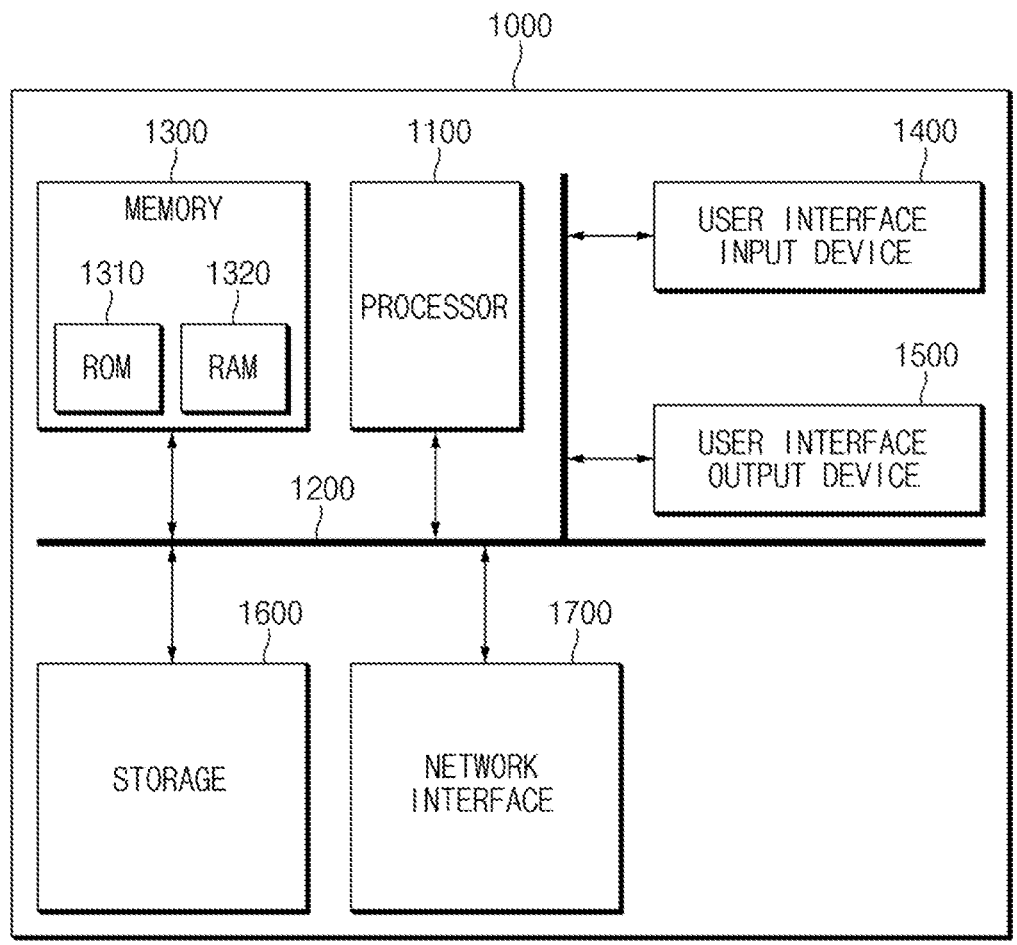
FIG. 8 illustrates a computing system in which a method according to an exemplar)/embodiment of the present disclosure is implemented.

FIG. 8 illustrates a computing system in which a method according to an embodiment of the present disclosure is implemented.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to the present disclosure, when the electronic push button-based shift selector of the shift by wire system fails, the vehicle enters a fail-safe mode and stops stably. Further, when the vehicle traveling is required for the emergency movement, the temporal unlocking is implemented by inputting the predetermined pattern. Therefore, the emergency situations may be dealt with quickly.

According to the present disclosure, it is possible to unlock for emergency movement only using a brake pedal and an accelerator pedal without adding any additional means, thereby reducing any cost.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling fail-safe for a vehicle, the device comprising:
   a driving device configured to engage a park-gear and a brake individually in a stopped state of the vehicle when a shift by wire system fails; and
   a controller configured to:
   lock the engaged the park-gear and brake, and
   unlock the park-gear and the brake when a predetermined unlock manipulation pattern is input using a brake pedal and an accelerator pedal of the vehicle.

2. The device of claim 1, further comprising:
   a determining device configured to monitor manipulation states of the brake pedal and the accelerator pedal of the vehicle in the locked state of the park-gear and the brake.

3. The device of claim 2, further comprising:
   a message processing device configured to output a message guiding the predetermined unlock manipulation pattern of the park-gear and the brake when a manipulation of the brake pedal or the accelerator pedal of the vehicle is identified in the locked state of the park-gear and the brake.

4. The device of claim 3, wherein the predetermined unlock manipulation pattern is set as a combination of inputs of the brake pedal and the accelerator pedal.

5. The device of claim 3, wherein when the brake pedal and the accelerator pedal are manipulated in a continuous pattern, the determining device determines whether the manipulation pattern matches the predetermined unlock manipulation pattern.

6. The device of claim 3, wherein the message processing device outputs a message indicating a fault state of the shift by wire system when the shift by wire system fails.

7. The device of claim 1, wherein the driving device switches from the park-gear and to a drive-gear when the park-gear and the brake are unlocked.

8. The device of claim 1, wherein the controller outputs a drive torque based on a degree to which the accelerator pedal is manipulated when the park-gear and the brake are unlocked and the accelerator pedal is manipulated.

9. The device of claim 1, wherein the controller limits a creep torque when the park-gear and the brake are unlocked.

10. The device of claim 1, wherein the driving device disengages the brake when the park-gear and the brake are unlocked and the accelerator pedal is manipulated.

11. The device of claim 1, wherein the controller locks the park-gear and engages the brake when the vehicle is stopped after the unlocking of the park-gear and the brake.

12. The device of claim 1, wherein when the shift by wire system fails and an engine of the vehicle is turned-off, the controller maintains the locked state of the park-gear and the brake when the engine of the vehicle is reactivated.

13. A method for controlling fail-safe for a vehicle, the method comprising:
    engaging a park-gear and a brake individually in a stopped state of the vehicle when a shift by wire system fails;
    locking the engaged park-gear and brake; and
    unlocking the park-gear and the brake when a predetermined unlock manipulation pattern is input using a brake pedal and an accelerator pedal of the vehicle.

14. The method of claim 13, further comprising:
    monitoring manipulation states of the brake pedal and accelerator pedal of the vehicle in the locked state of the park-gear and the brake; and
    outputting a message guiding the predetermined unlock manipulation pattern of the park-gear and the brake when a manipulation of the brake pedal and the accelerator pedal is identified.

15. The method of claim 14, further comprising:
    determining whether a manipulated pattern matches the predetermined unlock manipulation pattern when the brake pedal and the accelerator pedal are manipulated in a continuous pattern.

16. The method of claim 13, further comprising outputting a message indicating a fault state of the shift by wire system when the shift by wire system fails.

17. The method of claim 13, further comprising:
    Switching from the park-gear to a drive-gear when the park-gear and the brake are unlocked; and
    outputting a drive torque based on a degree to which the accelerator pedal is manipulated when the accelerator pedal is manipulated.

18. The method of claim 17, further comprising disengaging the brake when the accelerator pedal is manipulated.

19. The method of claim 13, further comprising engaging and locking the park-gear and brake individually when the vehicle is stopped after the unlocking of the park-gear and the brake.

20. A vehicle system comprising:
- a shift by wire system of a vehicle; and
- a fail-safe controlling device configured to:
- monitor a fault state of the shift by wire system,
- engage and lock a park-gear and a brake individually in a stopped state of the vehicle when the shift by wire system fails, and
- unlock the park-gear and the brake when a predetermined unlock manipulation pattern is input using a brake pedal and an accelerator pedal of the vehicle.

* * * * *